(12) United States Patent
Hayton

(10) Patent No.: US 9,422,956 B2
(45) Date of Patent: Aug. 23, 2016

(54) PANEL MOUNTING ARRANGEMENT

(71) Applicant: ROLLS-ROYCE PLC, London (GB)

(72) Inventor: Paul Robert Hayton, Bristol (GB)

(73) Assignee: ROLLS-ROYCE PLC, London (GB)

( * ) Notice: Subject to any disclaimer, the term of this patent is extended or adjusted under 35 U.S.C. 154(b) by 363 days.

(21) Appl. No.: 14/154,719

(22) Filed: Jan. 14, 2014

(65) Prior Publication Data
US 2014/0219707 A1   Aug. 7, 2014

(30) Foreign Application Priority Data

Feb. 7, 2013  (GB) .................................. 1302125.8

(51) Int. Cl.
*F16B 5/00* (2006.01)
*F16B 5/06* (2006.01)

(52) U.S. Cl.
CPC ............... *F16B 5/00* (2013.01); *F16B 5/0607* (2013.01); *F16B 5/0621* (2013.01); *Y10T 403/217* (2015.01); *Y10T 403/30* (2015.01)

(58) Field of Classification Search
CPC . Y10T 403/28; Y10T 403/29; Y10T 403/30; Y10T 403/217; F16B 5/0607; F16B 5/0621; F16B 5/065; F16B 5/00
USPC ........ 403/28, 29, 30, 167, 168, 217; 60/799, 60/800, 766
See application file for complete search history.

(56) References Cited

U.S. PATENT DOCUMENTS

| 2,795,108 | A |   | 6/1957  | Saldin |  |
|---|---|---|---|---|---|
| 3,077,958 | A | * | 2/1963  | Grimsey, Jr. | G05D 23/024 33/702 |
| 3,690,705 | A | * | 9/1972  | Ygfors | F16B 5/0258 403/224 |
| 3,826,088 | A | * | 7/1974  | Nash | C07D 277/587 285/123.1 |
| 4,098,476 | A | * | 7/1978  | Jutte | F16B 4/004 138/108 |
| 4,281,941 | A | * | 8/1981  | Rottenkolber | F01D 5/025 228/124.7 |
| 4,297,769 | A | * | 11/1981 | Coules | F16B 21/086 174/138 D |
| 4,789,370 | A | * | 12/1988 | Ellefson | A63H 33/062 446/113 |
| 4,790,704 | A | * | 12/1988 | Temple | F16B 5/065 188/340 |
| 5,251,993 | A | * | 10/1993 | Sigourney | F16B 5/0216 248/298.1 |
| 5,445,469 | A | * | 8/1995  | Huck | F01D 25/243 403/24 |
| 5,451,116 | A | * | 9/1995  | Czachor | F01D 9/065 403/28 |
| 5,468,026 | A | * | 11/1995 | Annestedt | F23J 13/02 138/148 |
| 5,497,616 | A | * | 3/1996  | Roberts | F16B 5/02 403/28 |

(Continued)

FOREIGN PATENT DOCUMENTS

| EP | 0 994 304 A2 | 4/2000 |
| EP | 1 677 050 A2 | 7/2006 |
| GB | 857345 | 12/1960 |

OTHER PUBLICATIONS

Jun. 17, 2013 Search Report issued in United Kingdom Patent Application No. GB1302125.8.

*Primary Examiner* — Joshua J Michener
*Assistant Examiner* — Matthew Gitlin
(74) *Attorney, Agent, or Firm* — Oliff PLC

(57) ABSTRACT

A panel mounting system comprises a panel, a foundation and a plurality of hangers connecting the panel to the foundation. The panel comprises a plurality of first attachment points, and the foundation comprises a plurality of second attachment points.

The panel is constrained by the plurality of hangers such that movement of each first attachment point relative to the corresponding second attachment point is constrained to a plane that is normal to the surface of the panel at the first attachment point, and is aligned with the direction of thermal expansion of the panel at the first attachment point.

9 Claims, 4 Drawing Sheets

(56) References Cited

U.S. PATENT DOCUMENTS

| | | | | |
|---|---|---|---|---|
| 6,726,391 B1* | 4/2004 | Kreis | .................... | F01D 25/246 403/28 |
| 7,614,236 B2* | 11/2009 | Mandet | .................... | F01D 25/24 60/766 |
| 8,291,594 B2* | 10/2012 | Etling | .................... | F16B 5/065 244/159.1 |
| 8,292,537 B2* | 10/2012 | Newswander | ......... | G02B 7/008 403/30 |
| 8,568,054 B2* | 10/2013 | Etling | .................... | B64G 1/58 403/28 |
| 8,636,465 B2* | 1/2014 | Durocher | ................ | F01D 25/26 29/426.4 |
| 2006/0239772 A1* | 10/2006 | Kuroda | .................... | F16B 5/065 403/329 |
| 2008/0110176 A1 | 5/2008 | Bunel et al. | | |
| 2009/0067917 A1* | 3/2009 | Keith | .................... | F01D 25/243 403/30 |
| 2012/0275845 A1* | 11/2012 | Etling | .................... | F16B 5/065 403/53 |

* cited by examiner

PANEL MOUNTING ARRANGEMENT

This invention claims the benefit of UK Patent Application No. 1302125.8, filed on 7 Feb. 2013, which is hereby incorporated herein in its entirety.

FIELD OF THE INVENTION

The present invention relates to a mounting arrangement for flat panels and particularly, but not exclusively, to a mounting arrangement for flat, rectilinear panels.

BACKGROUND TO THE INVENTION

The exhaust duct for a gas turbine engine is conventionally a circular duct which connects to the turbine stage outlet of the engine. The use of a circular duct is convenient since it can be readily connected to the turbine outlet of the engine. In addition, thermal expansion of the exhaust duct resulting from the heat of the exhaust gas flow may be readily accommodated by the radial growth of the exhaust duct.

However, in many gas turbine engine installations it is desirable for the exit portion of the exhaust duct to be non-circular because this can make the mechanical installation of the exhaust duct into its supporting structure easier and more convenient.

In particular it is advantageous for the exhaust duct to be rectilinear in cross-section to facilitate the mounting of the exhaust duct within its surrounding structure.

Due to the need to accommodate dimensional changes in the exhaust duct resulting from the hot exhaust gases passing through the exhaust duct it is known to provide a duct mounting arrangement that independently accommodates both axial and lateral growth (i.e. two degrees of freedom, shown as 1 and 2 in FIG. 1) of the exhaust duct resulting from thermal expansion of the duct. Such mounting arrangements are required to accommodate movement of the duct both axially and laterally and can be mechanically complicated.

It is an object of the present invention to provide a mounting arrangement for a non-circular cross-section exhaust duct that supports the exhaust duct by means of a simple connection having a single degree of freedom.

STATEMENTS OF INVENTION

According to a first aspect of the present invention there is provided a panel mounting system comprising:
  a panel comprising a plurality of first attachment points;
  a foundation comprising a plurality of second attachment points; and
  a plurality of hangers connecting the panel to the foundation;
the panel being constrained by the plurality of hangers such that movement of each first attachment point relative to the corresponding second attachment point is constrained to a plane that is normal to the surface of the panel at the first attachment point, and is aligned with the direction of thermal expansion of the panel at the first attachment point.

An advantage of the mounting system of the invention is that the axial and lateral components of the expansion of the exhaust duct (in this case, the panel) can be accommodated by a single resultant displacement shown pictorially as 3 in FIG. 1.

Each of the hangers of the mounting system therefore requires only one main degree of freedom which makes the mounting system simpler and more convenient than conventional mounting arrangements.

By aligning each hanger such that its respective degree of freedom is aligned with the direction of thermal expansion of the panel at its point of attachment to the corresponding hanger, it is possible to rigidly fasten the hanger to both the panel and the foundation. This allows the mounting system of the invention to use permanent fasteners, such as bolts and spot welds, which are cheaper, more convenient and easier to install than any joining arrangement requiring sliding movement at the joints.

A further advantage of this arrangement is that the panels and corresponding hangers are all joined together so the location of each of the attachment points to the foundation is known and stable. This makes assembling the hangers to the foundation easier and more convenient.

Optionally, each of the plurality of hangers has a first end and a second end, each first end being attached to a respective first attachment point and each second end being attached to a respective second attachment point.

In the present invention, each of the plurality of hangers is formed as a single component having a first end and an opposite second end. An advantage of the invention is that the compliance (between respective first and second ends) of the hanger in a first plane is substantially smaller than its compliance in the two planes orthogonal to the first plane.

This means that the mounting system requires no moving parts, which makes the system simpler and more convenient than conventional mounting arrangements.

Optionally, each of the plurality of hangers is serpentine in profile.

In one arrangement, each of the plurality of hangers is formed from a flat strip of material having a serpentine cross-sectional profile. This results in the hanger having a lower compliance (between its free ends) in the plane of the serpentine cross-section than in either of the orthogonal planes.

Optionally, each of the plurality of hangers is C-shaped in profile.

In an alternative arrangement, each of the plurality of hangers is formed from a flat strip of material having a C-shaped cross-sectional profile. This provides for a preferentially smaller compliance in one plane of the hanger than in either of the two corresponding orthogonal planes.

Optionally, each of the plurality of hangers is removably attached to the panel.

Providing for each hanger to be removably attached from the panel makes the mounting system more convenient for a user who may need to remove the panel for service or repair purposes.

Optionally, each of the plurality of hangers is removably attached to the foundation.

Making each of the hangers removable from the foundation makes the mounting system easier and more convenient to assembly for a user.

Optionally, each of the plurality of hangers is formed from a flat sheet material.

Forming each of the hangers from a flat sheet of material makes the hanger easier and cheaper to fabricate than conventional mounting arrangements Optionally, the thermal coefficient of expansion of each of the plurality of hangers is smaller than the thermal coefficient of expansion of the panel.

Movement of the panel resulting from its thermal expansion must be accommodated by corresponding movement between corresponding opposing ends of the plurality of hangers.

Optionally, the thermal coefficient of expansion of the panel is smaller than the thermal coefficient of expansion of the foundation.

If the thermal coefficient of expansion of the panel is smaller than the thermal coefficient of expansion of the foundation, for any given temperature increase the expansion of the panel will be less than that of the foundation. This ensures that the pane will not be mechanically compromised by contacting any surrounding structure.

Optionally, the panel mounting system further comprises a centre mount positioned at the geometric centre of the panel, the centre mount rigidly connecting the panel to the foundation.

By rigidly connecting the panel to the foundation, at its geometric centre point, any expansion of the panel resulting from thermal expansion will be evenly distributed across the panel. In other words, the movement of the panel is distributed radially outwards from the geometric centre of the panel. The use of a rigidly connected centre mount also minimises any load on the hangers while the hangers distort in shape when the panel expands or contracts. This is because loads generated in opposing hangers about the fixed centre mount are opposite in direction but similar in magnitude and so cancel each other out, so leaving no resultant load on the centre mount.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
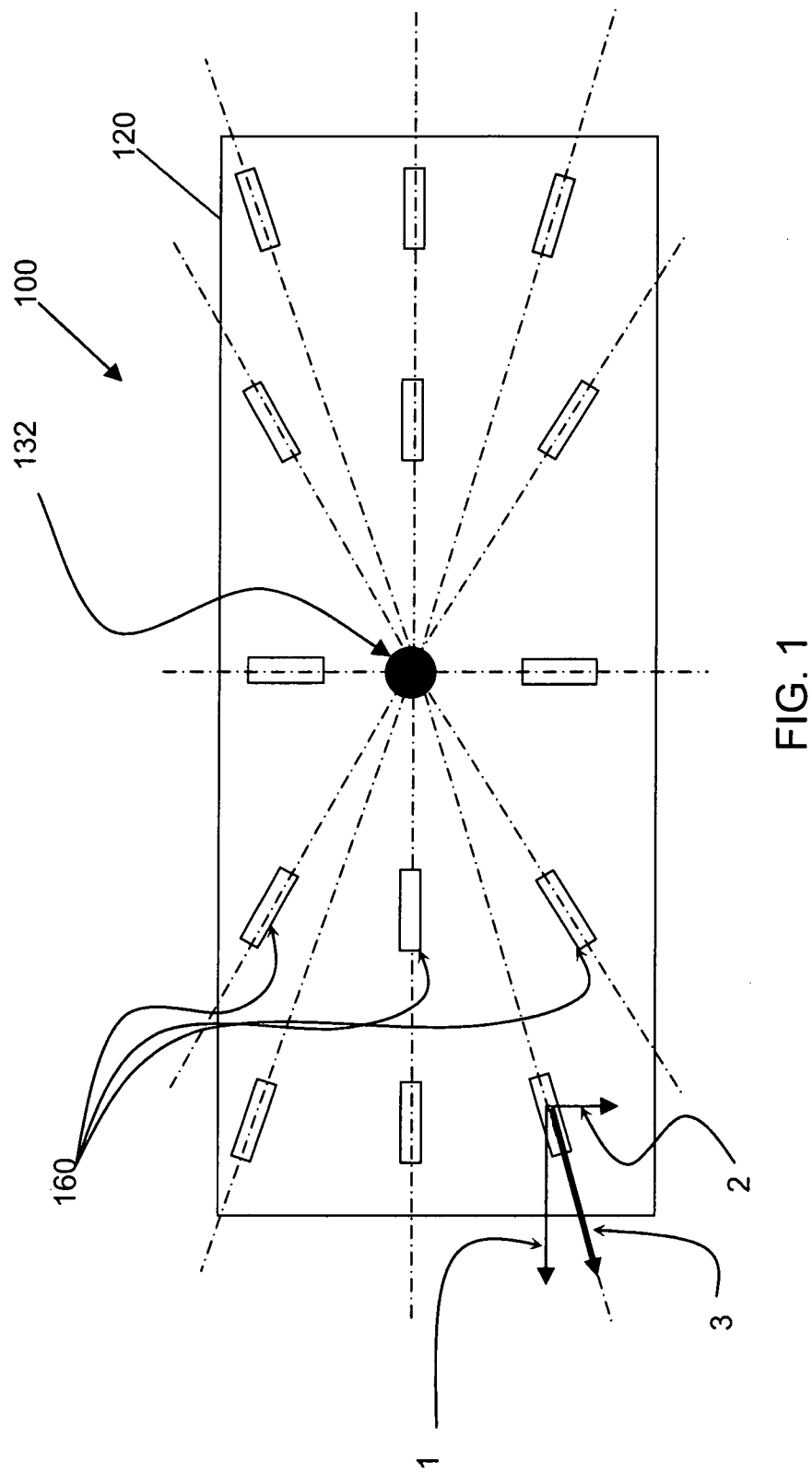
FIG. 1 shows a schematic plan view of a panel mounting arrangement according to an embodiment of the invention.
Figure 2:
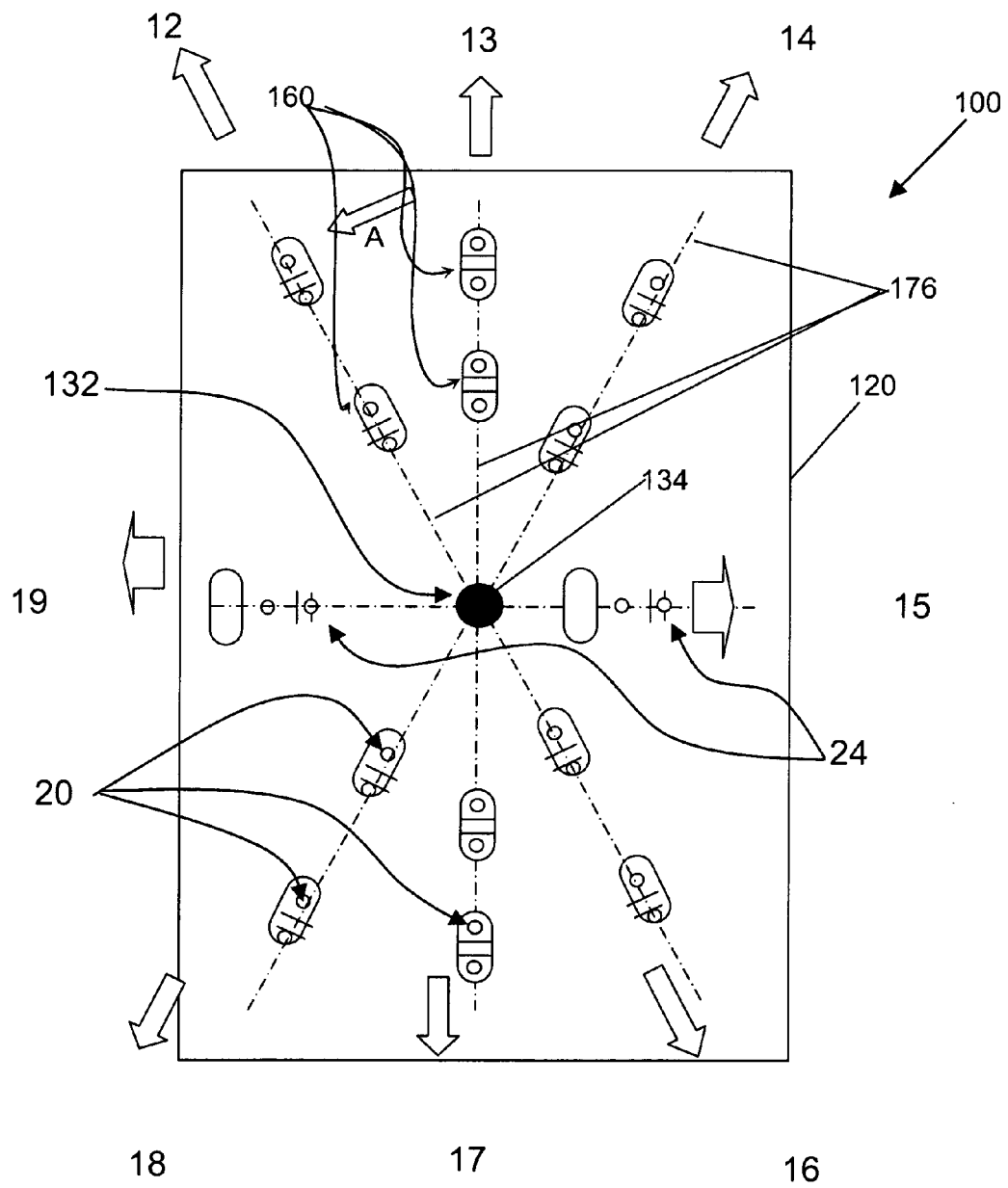
FIG. 2 shows a schematic plan view of the panel mounting arrangement of FIG. 1 showing the movement of the panel resulting from thermal expansion.
Figure 3:
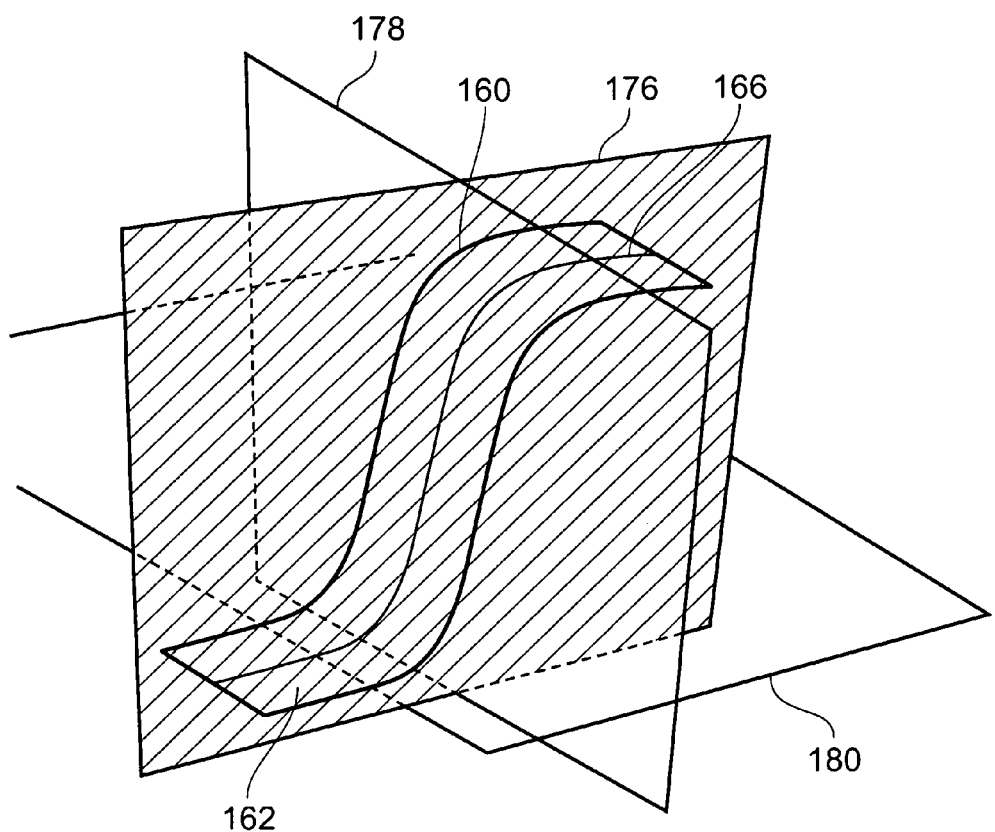
FIG. 3 shows a schematic perspective view of a hanger of the panel mounting arrangement of FIG. 1.

Referring to FIGS. 1 to 4B, a panel mounting system according to an embodiment of the invention is designated generally by the reference numeral 100.

The panel mounting system 100 forms part of the exhaust duct (not shown) of a gas turbine engine (not shown) installed in an aircraft fuselage (not shown).

The panel mounting system 100 comprises a panel 120, a foundation 140 and a plurality of hangers 160. The panel 120 comprises a plurality of first attachment points 122 and a centre mount 132. The foundation 140 comprises a plurality of second attachment points 142.

The panel 120 has a first surface 126 and an opposed second surface 128. The first surface 126 is a gas washed surface which in the present embodiment is exposed to an exhaust gas flow (not shown). The aforementioned plurality of first attachment points 122 and the centre mount 132 are located on the second surface 128.

The centre mount 132 is located at the geometric centre 134 of the panel 120. In the present embodiment, the centre mount 132 connects together the panel 120 and the foundation 140 by means of a threaded fastener 136.

In the embodiment shown the panel 120 is formed from a titanium alloy sheet. In alternative arrangements, the panel 120 may be formed from another metallic sheet material.

Each one of the plurality of hangers 160 has a first end 162 and an opposite second end 166. Each first end 162 of each one of the plurality of hangers 160 is removably attached to a respective one of the first attachment points 122.

The hangers 160 are formed from strips of high temperature resistant steel having a coefficient of thermal expansion that is greater than the thermal coefficient of expansion of the panel 120. Each hanger 160 is formed with a serpentine, or Z-shaped, cross-sectional profile and is typically formed from sheet metal that is approximately 10 mm to 40 mm wide and approximately 1.0 mm to 2.0 mm in thickness.

The Z-shaped, or serpentine, cross-sectional profile 170 of each hanger 160 results in the hanger having a compliance in a first plane 176 of the serpentine profile 170 that is significantly smaller than the compliance in either of the second and third planes 177,178, each of the second and third planes 177,178 being orthogonal to the first plane 176.

In the embodiment shown, each first end 162 of the hanger 160 is removably fastened to the corresponding first attachment point 122 by means of a rivet 124. In an alternative arrangement the rivet 124 may be replaced by a spot weld (not shown), threaded fastener (not shown) or another suitable fastening technique.

Figure 4A:
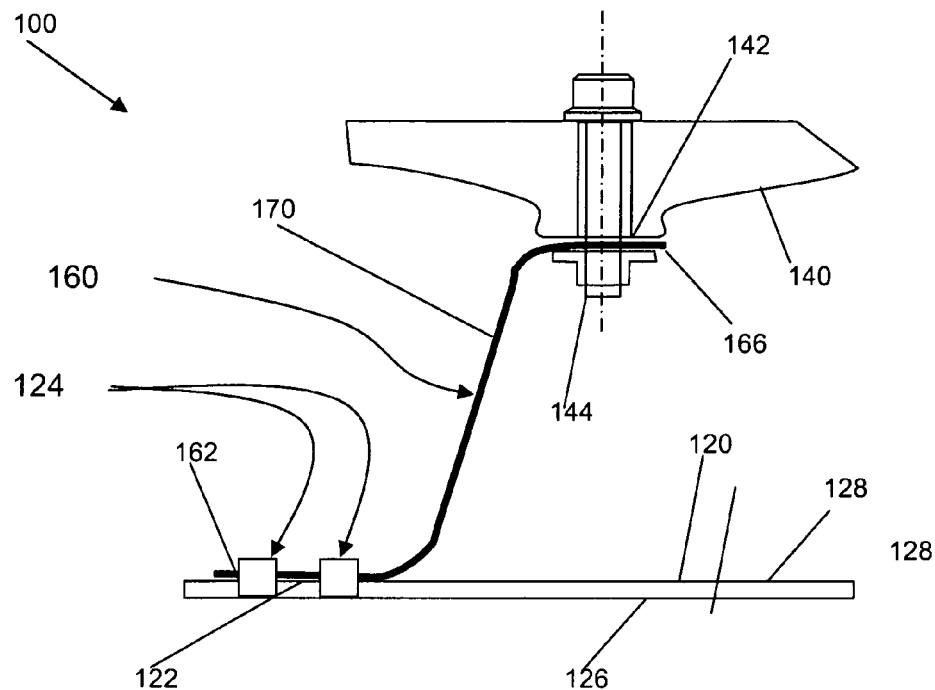
FIGS. 4A and 4B show schematic sectional views of a hanger forming part of the panel mounting arrangement of FIG. 1.
Figure 4B:
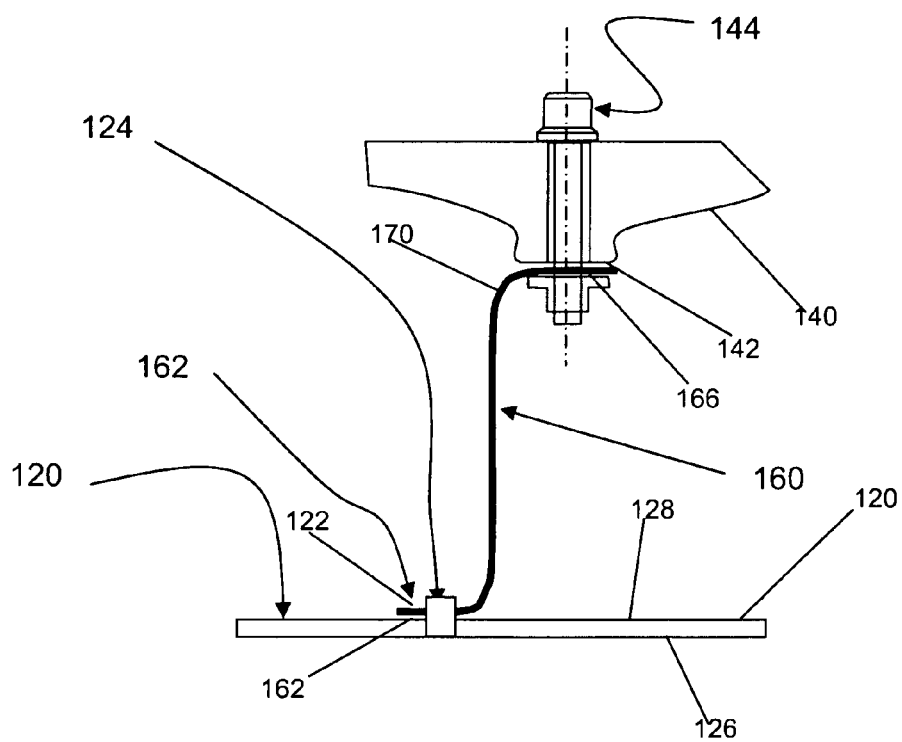

To prevent the hanger 160 from twisting and so becoming misaligned, it is preferred to use two or more rivets 124 (an example of which arrangement is shown in FIG. 4A).

Each second end 166 of the hanger 160 is removably fastened to the second attachment point 142 of the foundation 140 by means of a threaded fastener 144, in this case a nut and bolt.

The plurality of hangers 160 are arranged across the surface of the panel such that the first plane 176 of each of the plurality of hangers 160 intersects at the geometric centre point 134 of the panel 120.

In use the panel 120 is exposed to a high temperature gas flow (not shown) which will cause the panel 120 to expand. This thermal expansion if constrained by the rigidity of the centre mount 132 will manifest itself across the panel 120 as radiating thermal growth emanating from the geometric centre point 134 and shown by arrows 12,13,14,15,16,17,18,19 in FIG. 2.

The first end 162 of each hanger 160 can readily move relative to the corresponding second end 166 of the respective hanger 160 in the first plane 170, while at the same time being constrained from corresponding relative movement in either of the second and third planes 177,178.

In other words, each hanger 160 is orientated such that it can flex (i.e. its respective first and second ends can move relative to one another) in the direction of thermal growth 12,13,14,15,16,17,18,19 of the panel 120.

FIG. 3A shows a hanger 160 in the 'cold' position, i.e. before the panel 120 has been exposed to any high temperature gas flow. The direction of the thermal growth is from right to left, said thermal growth being represented by arrows 12,13,14,15,16,17,18,19 in FIG. 2. To accommodate the thermal growth the hanger 160 flexes thereby adopting the configuration shown in FIG. 4B. Continued thermal growth of the panel 120 results in further flexure of the hanger 160 until at a limit position, the hanger 160 adopts a limit configuration being a lateral mirror image configuration of FIG. 4A.

In the exhaust duct arrangement of the present embodiment, cooling air would be flowing in the general direction of arrows 13,17 to prevent any overheating of the panel 120. While some of the hangers 160 may offer some resistance to this cooling airflow, this resistance will be minimal.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A panel mounting system comprising:
    a panel comprising a plurality of first attachment points;
    a foundation comprising a plurality of second attachment points;
    a plurality of hangers connecting the panel to the foundation, each hanger having a first plane; and
    a center mount positioned at a geometric center of the panel, the center mount rigidly connecting the panel to the foundation,
    wherein:
        the plurality of hangers are arranged across the surface of the panel such that the first plane of each of the plurality of hangers intersects at the geometric center of the panel, and
        the panel is constrained by the plurality of hangers such that movement of each first attachment point relative to the corresponding second attachment point is constrained to a plane that is normal to the surface of the panel at the first attachment point, and is aligned with a direction of thermal expansion of the panel in the first plane of each of the plurality of hangers at the first attachment point.

2. The panel mounting system as claimed in claim 1, wherein each of the plurality of hangers has a first end and a second end, each first end being attached to a respective first attachment point and each second end being attached to a respective second attachment point.

3. The panel mounting system as claimed in claim 1, wherein each of the plurality of hangers is serpentine in profile.

4. The panel mounting system as claimed in claim 1, wherein each of the plurality of hangers is C-shaped in profile.

5. The panel mounting system as claimed in claim 1, wherein each of the plurality of hangers is removably attached to the panel.

6. The panel mounting system as claimed in claim 1, wherein each of the plurality of hangers is removably attached to the foundation.

7. The panel mounting system as claimed in claim 1, wherein each of the plurality of hangers is formed from a flat sheet material.

8. The panel mounting system as claimed in claim 1, wherein the thermal coefficient of expansion of each of the plurality of hangers is greater than the thermal coefficient of expansion of the panel.

9. The panel mounting system as claimed in claim 1, wherein the thermal coefficient of expansion of the panel is smaller than the thermal coefficient of expansion of the foundation.

* * * * *